Jan. 28, 1969    J. MERCIER    3,423,934
HYDRAULIC CONTROL EQUIPMENT
Filed Nov. 17, 1966    Sheet 1 of 4
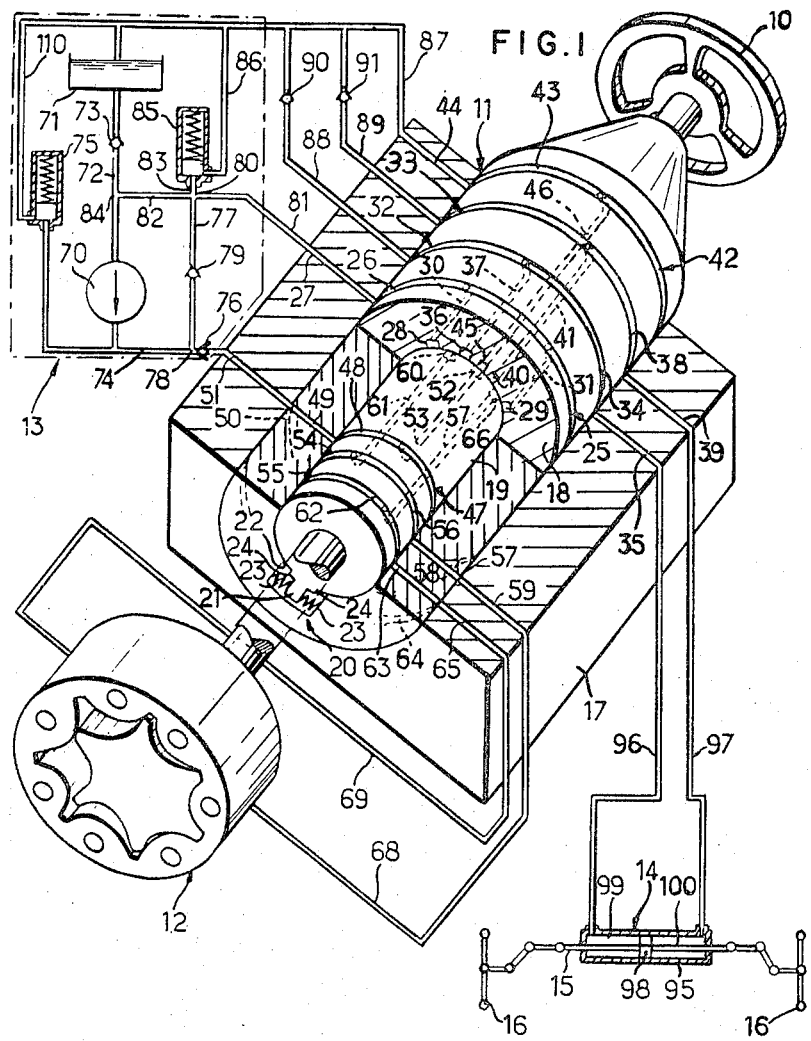
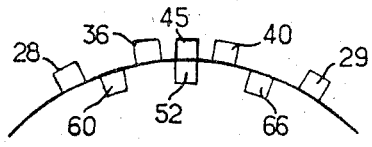
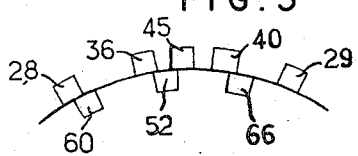
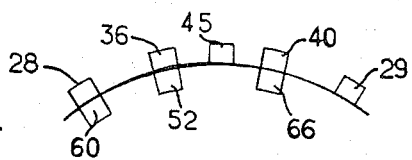
INVENTOR
JEAN MERCIER
BY
ATTORNEY

INVENTOR
JEAN MERCIER
BY
ATTORNEY

Jan. 28, 1969    J. MERCIER    3,423,934
HYDRAULIC CONTROL EQUIPMENT
Filed Nov. 17, 1966    Sheet 4 of 4

INVENTOR
JEAN MERCIER

BY *[signature]*
ATTORNEY

United States Patent Office 3,423,934
Patented Jan. 28, 1969

3,423,934
HYDRAULIC CONTROL EQUIPMENT
Jean Mercier, 501 Bloomfield Ave.,
Caldwell, N.J. 07006
Filed Nov. 17, 1966, Ser. No. 595,085
Claims priority, application France, Nov. 30, 1965,
40,239; Mar. 21, 1966, 54,248
U.S. Cl. 60—52
Int. Cl. F15b *15/18, 9/10;* B62d *5/00*
22 Claims

ABSTRACT OF THE DISCLOSURE

The present invention relates to a device for controlling a hydraulic motor, such as a servo or other motor, for positioning or operating a member of any type and which includes a valve of the rotary type, that comprises an operating member that is adapted to drive a bidirectional reversible volumetric pump through the intermediary of a connection having limited angular play which is formed between two concentric rotary parts of the rotary valve. The relative position of the said parts is determined by the torque of the operating member; by the torque of the volumetric pump and by resilient means for restoration to an intermediate neutral position in which the motor ceases to be fed. While in or in the vicinity of each of the extreme relative positions of the two parts of the valve, the said parts have intercommunicating passages for fluid such that the motor is brought into operation and has a return path which feeds the suction side of the volumetric pump through the intermediary of the valve.

---

The invention relates more particularly to such a device for the assisted or unassisted steering of all land, sea and air vehicles. It likewise relates to such a device for putting a workpiece in place beneath a press and for controlling the height of the grabs of a lifting truck and other allied uses.

It is among the objects of the invention to provide a control device of the above type which is relatively simple in construction and which will provide dependable and controllable flow of fluid under pressure to a hydraulic motor to operate the latter.

A device according to the invention is characterized in particular by the feature that an operating member is adapted to drive a bidirectional reversible volumetric pump through the intermediary of a connection having limited angular play which is formed between two concentric rotary parts of a distributing valve of the rotary type. The relative position of the said parts is determined by the torque of the operating member; by the torque of the volumetric pump and by resilient means for restoration to an intermediate neutral position in which the motor ceases to be fed. While in or in the vicinity of each of the extreme relative positions of the two parts of the valve, the said parts have intercommunicating passages for fluid such that the motor is brought into operation and has a return path which feeds the suction side of the volumetric pump through the intermediary of the valve.

More particularly, in accordance with the invention, the control device comprises a bidirectional volumetric pump, the two sides of which form respectively the delivery and suction sides or vice versa according to the direction in which the pump is driven. In addition, the device comprises a valve having a fixed part or manifold and two coaxial rotary parts, the first of these rotary parts being connected to an operating member while the second rotary part drives the said pump. The two rotary parts are arranged to shift relatively to one another between a neutral position and one or another of two extreme working positions, one of the rotary parts having discharge means and two working cavities which are permanently connected respectively to the two ducts of the motor while the other rotary part has a pressure cavity and two transit cavities which are permanently connected respectively to the two sides of the volumetric pump in such manner that in the neutral position each of the working cavities is isolated, while in the vicinity of each of the extreme positions the pressure cavity communicates with one of the working cavities, and the other working cavity communicates with one of the transit cavities and the other transit cavity communicates with the discharge means.

The arrangement, according to the invention, has the effect of permitting accurate and precise operation of the hydraulic motor with a rugged construction.

The installation may operate with assistance or without assistance. In the first case, a central pressure station is provided and feeds the pressure cavity of the valve. If this central station breaks down, the volumetric pump may serve as an emergency drive for the motor owing to a connecting conduit between the discharge means and the pressure cavity of the said valve, the said connecting conduit comprising a nonreturn valve for giving preference to the central station when this is operating normally.

When it is required to operate the installation without assistance, the volumetric pump itself alone actuates the motor, owing to a connecting conduit connecting, as above, the discharge means and the pressure cavity of the valve, but this conduit does not need to include a nonreturn valve since there is no central station.

It will be noted that the volumetric pump works with a very slight pressure in both directions. This pump may be inexpensive and have a very high volumetric output. From the fact that the volumetric pump does not work at high pressure it has negligible internal losses and is of high precision. It will also be noted that the operation of the system is symmetrical.

In one embodiment, the valve is open when in neutral or central position. In this case, in the neutral position the pressure cavity of the second rotary part of the valve is put in communication with a passage which is formed in the first rotary part of the valve and which is permanently branched off to a reservoir.

In another modification, the valve is closed when in neutral or central position, and in the neutral position the pressure cavity does not have a return path to a reservoir.

In the embodiments above set forth, the volumetric pump is always traversed by the fluid returning from the hydraulic motor.

In additional embodiments of the invention, the volumetric pump may always be traversed by the fluid feeding the hydraulic motor, or the volumetric pump may be traversed in one direction by the fluid feeding the hydraulic motor and in the other direction by the fluid returning from the hydraulic motor.

It is accordingly another object of the present invention to provide a control device for a hydraulic motor in which the external reactions are absorbed while the oscillations that may result from the relative elasticity of the piping or from the compressibility of the hydraulic fluid are damped.

The invention also aims at enabling the user to react to external forces having a persistent action, for example, road camber in the case of a car, while reducing the effort by the driver to that which is necessary for overcoming the springs for returning the distributing valve to neutral.

The invention further aims at good performances as regards change of direction and easy performance of emergency operations.

In accordance with such additional embodiments of the invention, the hydraulic motor is connected to two orifices in the fixed body or manifold of a distributing means comprising also two coaxial rotary parts, a first of these rotary parts being connected to an operating member while the second rotary part drives a reversible and bidirectional volumetrical pump. The two rotary parts are adapted to shift relatively to one another between a neutral position and one or other of two working positions, the relative movements of the two rotary parts controlling the communication of the hydraulic motor with a pressure source and a return path. In the neutral position the pressure source is in communication with each side of the hydraulic motor via passages of very reduced cross-section, one of these passages being covered upon a very slight displacement of one of the rotary parts relative to the other, whereas, the opening of the other passage increases without the return path from the other side of the hydraulic motor opening.

Owing to this arrangement, maintenance under pressure which is favorable to precise operations is insured in the neutral position.

It is to be noted that since the two sides of the motor are under a pressure of several atmospheres, the volume of the small bubbles of air that may be drawn into the system is reduced proportionately. The invention confers on the installation qualities approaching those of unassisted manual controls, generating a passive resistance to the external forces without substantially altering the steering.

In one of such additional embodiments, in the neutral position the communication of very small section is formed between the pressure cavity in the second rotary part and the two working cavities in the first rotary part. This communication with one of the working cavities ceases when the two rotary parts commence to be displaced relatively to one another in the direction that corresponds to feeding of the motor by the other working cavity, one side of the motor being kept under pressure without the other side being connected to the return path.

In another of such additional embodiments, the communication of very small section is formed on the one hand between two pressure cavities in the second rotary part, which are connected respectively to a source of pressure through the intermediary of two nonreturn valves, and on the other hand two working cavities in the first rotary part connected respectively to the two sides of the motor, each of the pressure cavities slightly overlapping one working cavity in the neutral position.

In the accompanying drawings in which are shown one or more of various possible embodiments of the several features of the invention:

FIG. 1 is a diagrammatic view of a device for controlling a hydraulic motor in which the distributing valve of the rotary type is open when in neutral or central position and is shown in perspective and partly broken away;

FIG. 2 shows the intercommunication chambers of the two rotary parts of the valve in the neutral position;

FIG. 3 is a view similar to FIG. 2, but in which the two rotary parts of the valve occupy an intermediate position between the neutral position and an extreme position;

FIG. 4 is a view similar to FIGS. 2 and 3, but in which the two rotary parts of the valve occupy an extreme position;

Figure 11:
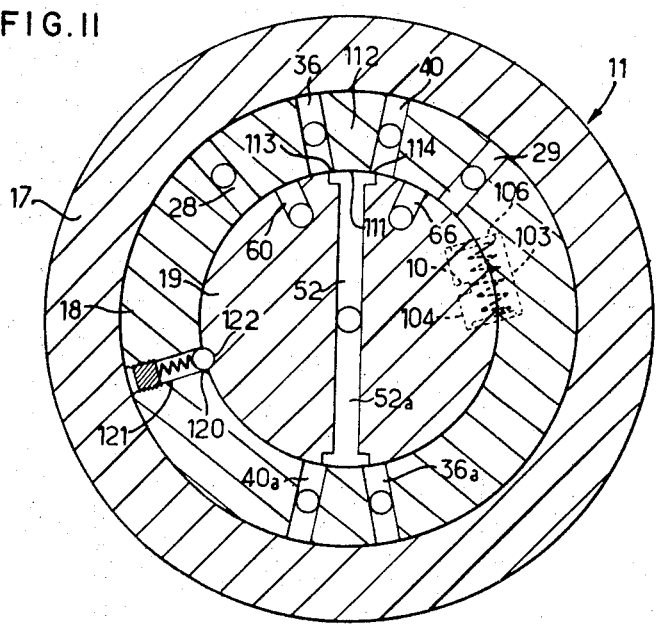
FIG. 11 is a view similar to FIG. 7, but shows a distributing valve of the rotary type which is closed when in neutral or central position.
Figure 12:
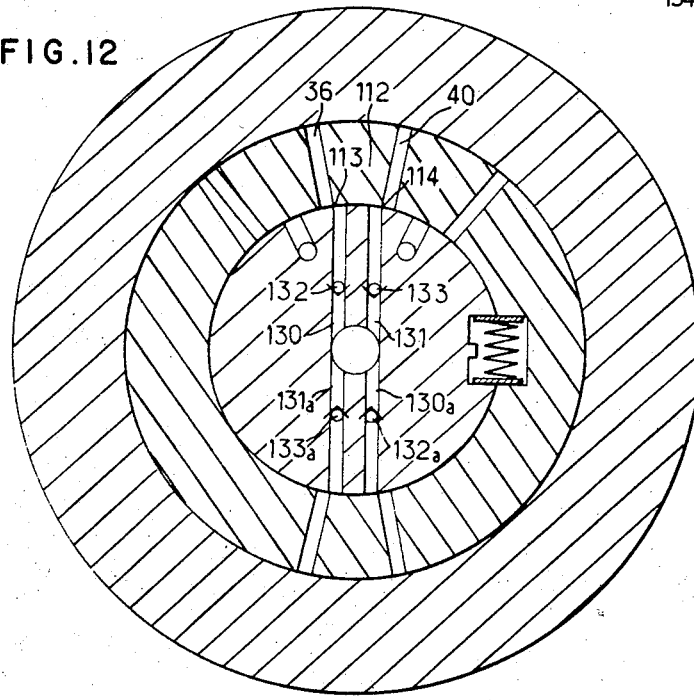

FIG. 12 relates to a modification of FIG. 11, comprising nonreturn valves; and

Figure 13:
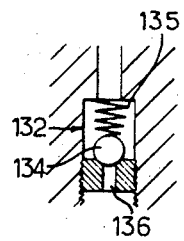

FIG. 13 shows one of the nonreturn valves in detail.

Referring now to the drawings, as shown in FIG. 1, the system comprises a steering wheel 10, a rotary valve 11, a volumetric pump 12, a central hydraulic station 13, and a hydraulic motor, for example a servomotor 14, the piston rod 15 of which illustratively actuates the steerable wheels 16 of a vehicle.

The rotary valve 11 comrpises a fixed body or manifold 17 in which is rotatably mounted a sleeve 18 which in turn accommodates a rotary core 19.

The sleeve 18 is connected to the steering wheel 10 and the core 19 drives the volumetric pump 12. The sleeve 18 and the core 19 have limited relative angular movement and cooperate with a resilient centering mechanism 20 tending to bring them to a predetermined intermediate position, called the neutral position. The centering mechanism comprises, for example, a lug 21 engaged with clearance in a recess 22, while two springs 23 disposed on each side of the lug act against the opposed walls of the recess. The lug 21 comprises shoulders 24 which cooperate with the opposed walls of the recess in order to define the extreme positions of relative movement of the parts 18 and 19 of the valve, the extreme positions being called the full working positions.

The sleeve 18 includes a discharge cavity 25 comprising a groove 26 permanently connected to a port 27 in the fixed body 17; two intercommunication chambers 28 and 29; and ducts 30 and 31 connecting the groove 26 to the chambers 28 and 29 respectively.

The sleeve 18 also has two working cavities 32 and 33. The cavity 32 comprises a groove 34 connected permanently to a port 35 in the fixed body 17; an intercommunication chamber 36; and a duct 37 connecting the groove 34 to the chamber 36. The cavity 33 comprises a groove 38 permanently connected to a port 39 in the fixed body 17; an intercommunication chamber 40; and a duct 41 connecting the groove 38 to the chamber 40.

Further, in the example illustrated in FIG. 1, the sleeve 18 has a cavity 42 comprising a groove 43 permanently connected to a port 44 in the fixed body 17; an intercommunication chamber 45; and a duct 46 connecting the groove 43 to the chamber 45.

The core 19 includes a pressure cavity 47 comprising a groove 48 permanently connected to a passage 49 in the sleeve 18, which itself permanently communicates, through the intermediary of a groove 50, with a port 51 in the fixed body 17; an intercommunication chamber 52; and a duct connecting the groove 48 to the chamber 52.

The core 19 also has two transit cavities 54 and 55. The cavit y54 comprises a groove 56 permanently connected to a passage 57 in the sleeve 18, which is itself permanently connected, through the intermediary of a groove 58, to a port 59 in the fixed body 17; an intercommunication chamber 60; and a duct 61 connecting the groove 56 to the chamber 60. The cavity 55 comprises a groove 62 permanently connected to a passage 63 in the sleeve 18, which it itself permanently connected, through the intermediary of a groove 64, to a port 65 in the fixed body 17; an intercommunication chamber 66; and a duct 67 connecting the groove 62 to the chamber 66.

As is shown in FIGS. 1 to 4, the intercommunication chamber 52 of the pressure cavity 47 is disposed between the intercommunication chambers 60 and 66 of the transit cavities 54 and 55, while the intercommunication chambers 36 and 40 of the working cavities 32 and 33, which are located respectively on each side of the intercommunication chamber 45 of the passage 42, are disposed between the intercommunication chambers 28 and 29 of the discharge cavity 25.

In the neutral position (FIG. 2) the chambers 52 and 45 communicate with one another, while the other chambers 60, 66, 28, 29, 36, 40 are individually isolated. The chamber 60 is located between the chambers 28 and 36 and the chamber 66 is located between the chambers 29 and 40.

In one of the extreme positions (FIG. 4), the chamber 52 of the pressure cavity communicates with the chamber 36 of one of the working chambers. The chamber 40 of the other working cavity communicates with the chamber 66 of one of the transit cavities. The chamber 60 of the other transit cavity communicates with the chamber 28 of the discharge cavity.

In the other extreme position (not illustrated but symmetrical with the extreme position of FIG. 4 relative to the neutral position shown in FIG. 2) the communications are as follows: 52 and 40; 36 and 60; 66 and 29.

Figure 5:
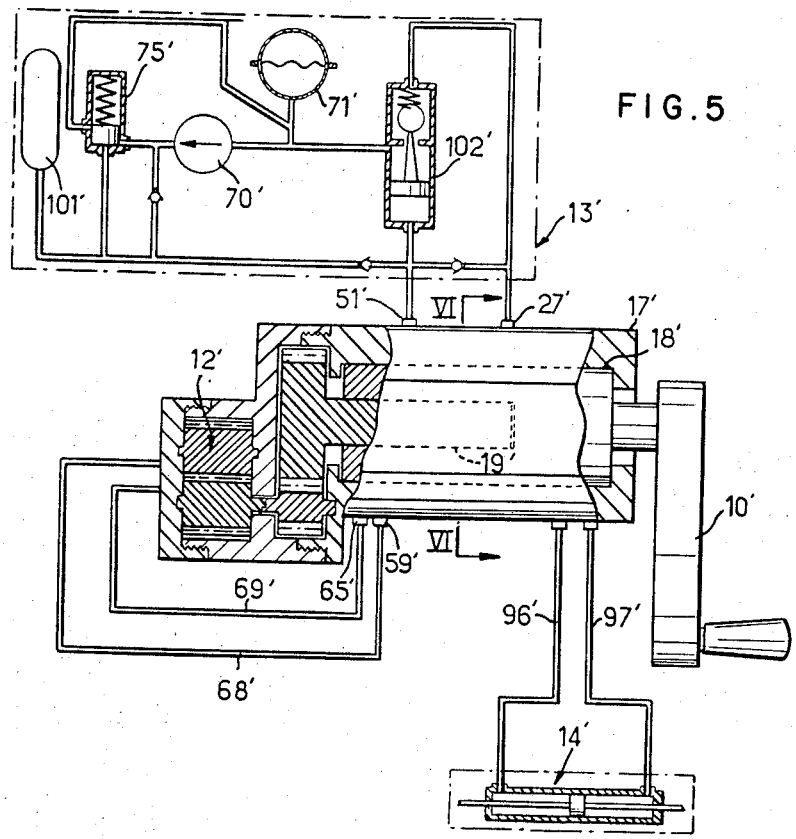
FIG. 5 is a diagrammatic view of a modified device in which the distributing valve of the rotary type is closed when in neutral or central position and is shown in longitudinal section.

The pump 12 is a reversible and bidirectional volumetric pump designed for low pressure, connected by two conduits 68 and 69 to the ports 59 and 65 respectively of the fixed body 17. One of the conduits 68 and 69 acts as a suction conduit and the other as a delivery conduit or vice versa according to the direction of rotation of the core 19. When the core 19 is stationary there is no transfer of liquid between the conduits 68 and 69. When the core turns in one direction there is transfer of liquid from the conduit 68 to the conduit 69. When the core 19 turns in the other direction there is transfer of liquid from the conduit 69 to the conduit 68. The pump 12 may, for example, be of the internal gear type as illustrated in FIG. 1, or of the type having external gears as illustrated in FIG. 5, or of any other suitable type.

The central hydraulic station 13 comprises a motor-pump 70 which is normally permanently in operation. The motor-pump 70 is connected to a reservoir 71 by a suction conduit including a nonreturn valve 73. The motor-pump 70 is connected to a delivery conduit 74 including a pressure limiting valve 75 which causes excess liquid to return to the reservoir 71 via a conduit 110. The limiter 75 determines a predetermined value of the pressure in the delivery conduit 74.

The delivery conduit 74 is connected to the port 51 of the valve 11 and includes a nonreturn valve 76. A conduit 77 branches off from the conduit 74 at a point 78 between the motor-pump 70 and the nonreturn valve 76. The conduit 77 includes a nonreturn valve 79 and branches at 80 into three other conduits 81, 82 and 83. The conduit 81 is connected to the port 27 of the valve 11. The conduit 82 branches off from the conduit 72 at a point 84 between the nonreturn valve 73 and the motor-pump 70. The conduit 83 includes a pressure limiter 85 which is set for a value lower than the limiter 75, and which causes the excess liquid to return to the reservoir 71 via a conduit 86. To give a practical example, the limiter 75 may be loaded for 300 kg./cm.² while the limiter 85 may be loaded for 50 kg./cm.².

The port 44 is connected by a conduit 87 to the reservoir 71. The grooves 34 and 38 are also respectively connected to the reservoir 71 by conduits 88 and 89 including nonreturn valves 90 and 91 respectively. The conduits 88 and 89, provided with a valves 90 and 91, have a topping up action such that any risk of cavitation is avoided.

As shown in FIG. 1, the nonreturn valves 73, 76, 90 and 91 are directed as follows. The valve 73 permits circulation in the direction 71, 83 and prevents it in the opposite direction. The valve 76 permits circulation in the direction 78, 51 and prevents it in the opposite direction. The valve 79 permits circulation in the direction 80, 78 and prevents it in the opposite direction. The valve 90 permits circulation in the direction 71, 34 and prevents it in the opposite direction. The valve 91 permits circulation in the direction 71, 38 and prevents it in the opposite direction.

The servomotor 14 comprises a body 95, the ends of which are connected by ducts 96 and 97 respectively to the ports 35 and 39 of the valve 11. In the servomotor 14 is mounted a sliding piston 98 to which the rod 15 is connected and which defines two chambers, one 99 communicating with the duct 96, the other 100 communicating with the duct 97. For operation in one direction the duct 96 is put under pressure, while the duct 97 acts as a return duct, and vice versa for operation in the other direction.

The operation of the system is as follows:

When the steering wheel 10 is not moved, the sleeve 18 is stationary and the centering mechanism 20 keeps the core 19 in the neutral position relative to the sleeve 18. The motor-pump 70 feeds without load via the circuits 74, 78, 76, 51, 50, 49, 48, 53, 52, 45, 46, 43, 44, 87, 71, 73, 72. The chambers 60 and 66 are isolated (FIG. 2), thus shutting off the pump 12 hydraulically. Since ducts 96 and 97 of servomotor 14 end in dead ends at 36 and 40 (FIG. 2), the servomotor is likewise shut off. Hence, the wheels 16 maintain their direction.

By making the sealing between the ducts of the servomotor and of the pump 12 selectively imperfect when the valve 11 is in neutral, there can be obtained at the steering wheel 10 a sensation related to the reactions of the road on the wheels 16 and a tendency for automatic straightening up.

When the driver turns the steering wheel 10 in order to change direction, the sleeve 18 turns relative to the core 19 against the action of the centering device, by reason of the fact that the core is rigidly connected to the pump 12 which is shut off hydraulically. The relative angular displacement of the sleeve 18 and the core 19 progressively opens the communication orifices, as shown in FIGS. 3 and 4, which has the effect, inter alia, of ending the hydraulic shutting off of the pump 12.

The output of the motor-pump 70 passes, due to the intercommunication of the chambers 52 and 36, into the duct 96 of the servomotor 14 and actuates the latter, the return flow from which passes from the duct 97 to the intercommunicating chambers 40, 66, then to the duct 69 that feeds the suction side of the volumetric pump 12. The output of the volumetric pump 12 passes via the conduit 68 and the intercommunicating chambers 60, 28 into the discharge conduit 81 which feeds the motor-pump 70 in preference to the reservoir 71.

If the driver, wishing to continue the direction changing operation, continues to turn the steering wheel 10 at a speed such that the sleeve 18 continues to drive the core 19 positively in spite of the tendency of the pump 12 to operate as a turbine under the action of the return flow from the servomotor 14, the parts 18 and 19 assume the position shown in FIG. 4 in which they remain and the movement of the servomotor continues.

If the driver retards the movement of the handwheel, the core 19, which is subjected to the driving action of the pump 12 operating as a turbine, changes its position relative to the sleeve 18 and passes through intermediate positions such as that shown in FIG. 3, before reaching the neutral position shown in FIG. 2. The steering movement of the wheels 16 is retarded with a progressive characteristic that corresponds to that which results from the action of the driver on the steering wheel 10.

If in the course of the operation the driver retards, then accelerates, then retards anew his action on the steering wheel 10, the parts 18 and 19 pass through the relative positions that start from that of FIG. 2 and that of FIG. 4 and vice versa, and the steering of the wheels follows faithfully the orders thus given by operation of the steering wheel 10.

The steering action of the wheels 16 is therefore accurately controlled by the steering wheel 10, without the resistance offered by the steering wheel 10 or the pressure at which the volumetric pump 12 works exceeding low values. The pump 12 thus works under excellent operating conditions, without risk of appreciable leakages, although the construction is simple and inexpensive.

The description that has just been given for the operation of the steering wheel 10 in one direction is equally valid for operation in the other direction.

If for any reason the motor-pump 70 of the central station breaks down, the driver may nevertheless continue to control the steering of the wheels 16 by operating the steering wheel 10, exerting an effort which is greater than before, but is acceptable. The pressure limiter 85, the loading of which is smaller than that of the discharge valve 75 of the motor-pump 70, determines the maximum pressure at which the system operates in this case.

The output delivered by the volumetric pump 12 into the circuits 68, 59, 60, 28, 30, 26, 27, 81 then passes via the circuits 77, 51, 50, 49, 48, 53, 36, 37, 34, 35, 96 into the chamber 99 of the servomotor 14, which insures steering of the wheels 16. The output that flows from the chamber 100, equal to the preceding one, passes to the suction conduit 69 of the pump 12.

It will be noted that owing to the topping up valves 90 and 91 any cavitation phenomenon in the system is avoided.

The pressure is limited at 85 and permits sufficiently effective emergency control of the steering of the wheels 16.

Figure 6:
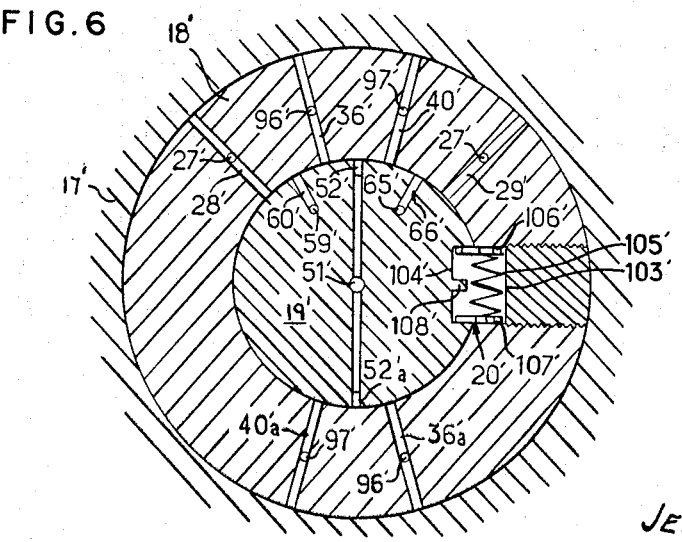
FIG. 6 shows the valve in transverse section on the line 6—6 of FIG. 5.

Reference will now be made to FIGS. 5 and 6, in which the arrangement is similar to that which has just been described with reference to FIGS. 1 to 4, but in which the valve is closed when in central position.

The same reference numerals primed have been adopted for FIGS. 5 and 6, and for FIGS. 1 and 4.

In FIGS. 5 and 6, the passage 42 including the elements 43, 45, 46 is omitted, as is the port 44 and the conduit 87. In the neutral position the chamber 52' of the pressure cavity 47' is thus isolated, i.e., has no return flow.

The central station 13' comprises, in addition to the motor-pump 70', a pressure accumulator 101', for example of the oleo-pneumatic type. The reservoir 71' is pressurized in order to insure good refilling of the system.

The port 27' branches from the reservoir 71' through the intermediary of a controlled valve 102' which is sensitive to the pressure of the accumulator 101' in such manner as to be open when this pressure is sufficient, when the central station is operating normally, and to be closed if this pressure is insufficient following breakdown of the central station.

It will be noted in FIG. 6 that the intercommunication chambers 52', 36' and 40' are doubled by diametrically opposite counter chambers 52'a, 36'a and 40'a adapted to establish equilibrium of the effects of pressure on the sleeve 18' and on the core 19'.

It will also be noted in FIG. 6 that the centering mechanism includes two facing recesses 103' and 104' formed in the sleeve 18' and in the core 19' and accommodating a spring 105' and two washers 106' and 107'. The recess 104' has a central lug 108' that limits the relative angular displacement of the parts 18' and 19'.

It will also be noted that in FIG. 6, for the sake of clarity, there has been marked against each duct section the reference numeral of the port (FIG. 5) with which it corresponds.

The operation is similar to that which has already been described.

The examples described above relate to devices which are normally assisted. It must be understood that the invention extends to cases in which the device is not assisted, i.e., does not have a pressure source such as a motor-pump 70 or 70'.

Figure 7:
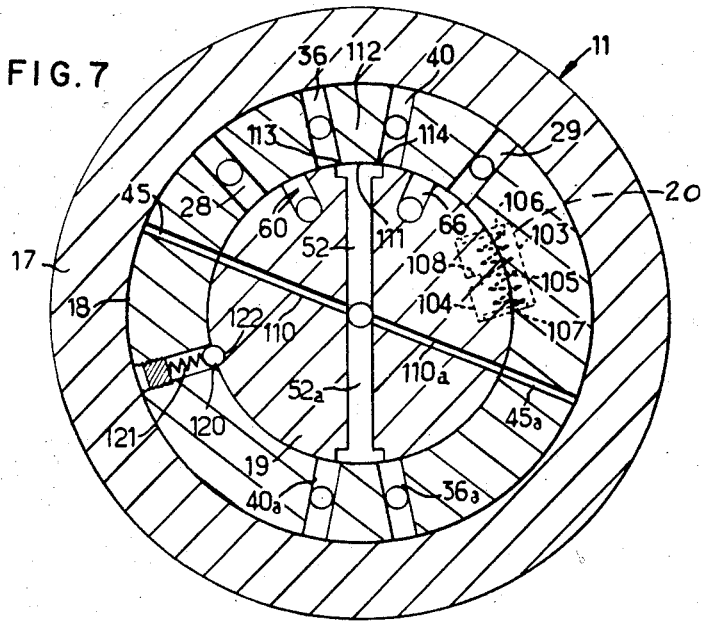
FIG. 7 is a diagrammatic view in transverse section of a distributing valve of the rotary type, open when in the neutral or central position.

In the embodiments shown in FIGS. 7 to 3, the rotary valve 11 comprises a fixed body or manifold 17 in which is rotatably mounted a sleeve 18 in turn accommodating a rotatably mounted core 19.

The sleeve 18, which is called the first rotary part of the valve, is connected to the steering wheel while the core 19, which is called the second rotary part, drives the volumetric pump.

The sleeve 18 and the core 19 have limited angular movement relatively to one another and cooperate with a resilient centering mechanism 20 tending to return them to a predetermined intermediate position called the neutral position. The centering mechanism 20 is shown in dotted lines because it is situated in a plane different from that of FIG. 1. The centering mechanism 20 comprises two facing recesses 103 and 104 formed in the sleeve 18 and the core 19, accommodating a spring 105, and two washers 106 and 107. The recess 104 includes a central lug 108 that limits the relative angular movement of the parts 18 and 19. Further, a ball 120 pressed by a spring 121 and cooperating with a notch 122 tends to keep the sleeve 18 and the plug 19 in neutral position.

The sleeve 18 includes two discharge cavities 28 and 29 which are permanently connected to the reservoir, and two working cavities 36 and 40 which are connected respectively to the two sides of the motor.

Further, in the example illustrated in FIG. 7, the valve 11 is open when centrally positioned and the sleeve 18 has a discharge cavity 45 permanently connected to the reservoir. The core 19 includes a pressure cavity 52 permanently connected to the central pressure station and comprising a passageway 110 adapted to cooperate with the cavity 45. The core 19 includes also two transit cavities 60 and 66 which are connected respectively to the two sides of the volumetric pump.

It will be noted in FIG. 7 that the intercommunication circuits 36, 40, 45, 52 and 110 is doubled by diametrically opposite counterparts 36a, 40a, 45a, 52a and 110a adapted to establish equilibrium of the effects of pressure on the sleeve 18 and on the core 19.

In the neutral position of the valve 11, FIG. 7, communication of very small cross section is formed between the pressure cavity 52 and the two working cavities 36 and 40. This communication with one of the working chambers, for example, the chamber 36, ceases when the sleeve 18 moves relative to the core 19 in the direction that corresponds to feeding of the other cavity, i.e., the cavity 40 in the example considered (FIG. 8), without the cavity 29 being put in communication with the cavity 66.

In order to effect this communication, the cavity 52 includes a mouth 111 which is slightly wider than the partition 112 between the cavities 36 and 40, so that in the neutral position there is slight overlap between the partition 112 and the left hand end of the mouth 111, and there is slight overlap 114 between the partition 112 and the right hand end of the mouth 111. The overlaps are equal, and to give a practical example each is of the order of a tenth of a millimetre, which corresponds to very slight leakage.

The operation is as follows: When the steering wheel is left stationary, the sleeve 18 is stationary and the centering mechanism 20 and 120, 122 keeps the core 19 in the neutral position relative to the sleeve 18. The pressure means deliver idly through the intermediary of the conduits 110 and 45.

The overlaps 113 and 114 enable favorable stability and flexibility to be insured in the neutral position. The arrangement according to the invention enables the external reactions that act alternately to be absorbed, with damping of the oscillatory movements in one direction and the other that could result in imperfectly accurate hydraulic controls by reason of the compressibility of the oil and the relative elasticity of the walls of the piping and apparatus.

It is to be noted that the restricted orifices 113 and 114 permit not only topping up but also a slight damping flow from one side of the servomotor to the other, which is of particular interest in the case of a ship's tiller and also for automobile vehicles in which the direction wheels are subjected to forces and vibration, the direction of which reverses.

Figure 8:
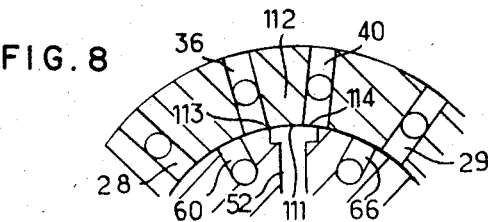
FIG. 8 is a detail view similar to FIG. 7, but in a position in which the communication between the pressure cavity and one of the working cavities is cut off, the discharge cavities both remaining covered.

In the position shown in FIG. 8, the arrangement according to the invention also enables external forces having a permanent action to be opposed, whether in the case of a ship or in the case of an automobile vehicle by reason of road camber, or the external urge to the neutral when making a turn of constant radius in a ship or car.

The external reaction is compensated by the pilot by a minimum movement of the tiller or steering wheel, which generates a resistant torque without involving output, i.e., practically a force without displacement.

One of the restricted orifices 113 and 114 is then shut off, for example, by movement of the sleeve 18 by two-tenths of a millimetre, which is composed of one millimetre of closing movement and one-tenth of a millimetre of recovering movement. The other orifice, which measures one-tenth of a millimetre, is thus shifted by three-tenths of a millimetre. In this position one of the chambers of the servomotor is under pressure without the other chamber having an outlet.

It will be noted that, analagously, the return path 110, 45 is then shut off.

Figure 10:
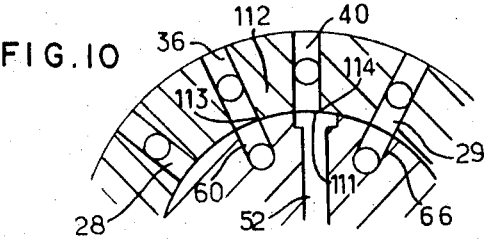
FIG. 10 is a view similar to FIG. 9, but shows this extreme position.

In order to change direction, the sleeve 18, which occupies a position such as that shown in FIG. 10 or possibly, during full lock operations, the position shown in FIG. 11 is caused to turn. The pressure cavity 52 feeds the working cavity 40 and the corresponding side of the motor, while the outflow from the motor passes through the working cavity 36, fed by the transit cavity 60, the reversible volumetric pump which becomes a motor, while the delivery of the said volumetric pump passes from the transit cavity 66 to the discharge cavity 29 from which it is returned to the reservoir. There is thus to some extent an effect such as is designated in the art as "feed-back."

If the alteration in the operating conditions when passing successively through the positions of FIGS. 7, 8, 9 and 10 is studied in more detail the following will be noted.

In FIG. 7, the two chambers of the servomotor are under a pressure of several atmospheres due to the leakages at 52, 36, 40. The ports 60 and 66 of the volumetric pump and the return ports 28 and 29 are shut off. The pump of the central hydraulic station which is branched off at 52 has a return flow through the open center valve at 110, 45, this return flow including a slight flow loss which is made up by the pressure due the leakages at 52, 36 and 40.

In FIG. 8 the port 40 is again uncovered. One chamber of the servomotor is under pressure. The other chamber of the servomotor begins to be isolated from the pressure source since the leakages are eliminated at 36. The ports 60 and 66 of the volumetric pump and the return ports 28 and 29 are still covered with a slight guard in order to avoid the risk of interference between the different phases of operation. The centrally open return path 45, which commences to close, has a decreased flow loss, causing a corresponding increase in the pressure towards the chamber of the servomotor communicating with 52 at 40.

Figure 9:
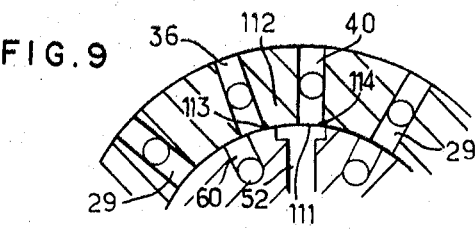
FIG. 9 is a view similar to FIG. 8, but in which the two parts of the valve occupy, relative to one another, a position between the neutral position and an extreme position.

In FIG. 9, the port 40 is completely uncovered. The chamber of the servomotor is at the pressure of the pump of the central hydraulic station. The other chamber of the servomotor begins to communicate at 36, 60 with the volumetric pump, while the other side of the said volumetric pump begins to communicate with the return path at 66, 29. The centrally open return path 45 is completely covered, so that the full pressure of the pump of the central hydraulic station is directed to the chamber of the servomotor communicating at 40 with 52.

In FIG. 10, the arrangement is similar to that of FIG. 9, but there is maximum registration at 40, 52 at 36, 60 and at 29, 66.

In the embodiment shown in FIG. 11, the arrangement is similar to that which has just been described with reference to FIGS. 7 to 10, but the valve 11 is of the type that is closed when centered and the cavities 110, 110a, 45 and 45a are omitted. The operation is similar to that which has previously been indicated. However, in the operation phases with closed center that correspond to the operating phases with open center of FIG. 7 and FIG. 8, the pressure resulting from the leakages is that of the pump of the central hydraulic station, and is not initially several atmospheres as was the case in FIGS. 7 and 8.

In another embodiment (FIGS. 12 and 13), the arrangement is still similar to those that have been described but the pressure cavity 52 is replaced by two conduits 130 and 131 which are provided respectively with two nonreturn valves 132 and 133 and are connected to the pressure source in the neutral position. The overlap 113 is formed by the part of the conduit 130 which overlaps the partition 112 to the left, while the overlap 114 is formed by the part of the conduit 131 which overlaps the partition 112 to the right.

Owing to this arrangement, the working cavities 36 and 40 which are connected to the two sides of the motor are kept permanently under pressure.

The addition of the said nonreturn valves prevents any intercommunication between the two sides of the hydraulic motor, as is necessary in certain cases, especially when there is no external urge towards the neutral position, such as hunting in automobile vehicles.

In FIG. 13 is seen one of the nonreturn valves, for example, the valve 132, which includes a ball 134 pressed by a spring 135 and cooperating with a seat 136.

For purposes of equilibrium the conduits 130 and 131 are doubled by counter conduits 130a, 131a, also provided with nonreturn valves 132a and 133a.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device for controlling a reversible hydraulic motor having a pair of ducts, said device comprising a bidirectional volumetric pump having a delivery and suction side, a valve comprising a fixed part and two coaxial rotary parts, an operating member, the first of said rotary parts being connected to said operating member, the second of said rotary parts being connected to said pump to drive the latter, said rotary parts being adapted to shift relative to each other between a neutral position and two extreme working positions on each side respectively of said neutral position, one of said rotary parts having discharge means and two working cavities adapted to be permanently connected respectively to the ducts of said hydraulic motor, said other rotary part having a pressure cavity and two transit cavities which are adapted to be connected to the two sides of said pump respectively, said discharge means, working cavities, pressure cavity and transit cavities being arranged so that in the neutral position of said valve each of the working cavities is cut off and in each of the extreme positions said pressure cavity communicates with one of the transit cavities and the other transit cavity communicates with the discharge means.

2. The combination set forth in claim 1 in which the first rotary part connected to the operating member incorporates said working cavities and discharge means and the second rotary part connected to said pump incorporates the pressure cavity and the transit cavities.

3. The combination set forth in claim 1 in which the first part comprises a manifold having a bore therein, said first rotary part comprises a sleeve rotatably mounted in the bore of said manifold and the second rotary part comprises a core rotatably mounted in said sleeve.

4. The combination set forth in claim 3 in which each of said discharge means and said working cavities comprises an annular groove associated with said sleeve and said pressure cavities and said transit cavities each comprises an annular groove associated with said core, each of said grooves having an associated port leading into said manifold and an intercommunication chamber is associated with each of said grooves, a duct connecting each of said grooves with the associated intercommunication chamber.

5. The combination set forth in claim 3 in which each of said discharge means and said working cavities comprises an annular groove associated with said sleeve and said pressure cavities and said transit cavities each comprises an annular groove associated with said core, each of said grooves having an associated port leading into said manifold and an intercommunication chamber is associated with each of said grooves, a duct connecting each of said grooves with the associated intercommunication chamber, each of said intercommunication chambers comprising a cavity formed in the bore of said sleeve and in the outer periphery of said core, said cavities being adapted to be aligned to provide intercommunication therebetween.

6. The combination set forth in claim 5 in which the intercommunication chamber of the pressure cavity is located between the intercommunication chamber of the transit cavities and the intercommunication chambers of the working cavities are located between the intercommunication chambers of the discharge means whereby in neutral position the intercommunication chamber of the pressure cavity is located between the intercommunication chambers of the working cavities, said intercommunication chambers of the working cavities being located between the intercommunication chambers of the transit cavities, said intercommunication chambers of the transit cavities being located between the intercommunication chambers of the discharge means.

7. The combination set forth in claim 6 in which an additional intercommunication chamber is associated respectively with each of the first named intercommunication chambers and diametrically opposed thereto to provide pressure balance of said rotary parts.

8. The combination set forth in claim 1 in which a centering mechanism is provided cooperating with said two rotary parts of said valve to urge said parts into neutral position.

9. The combination set forth in claim 1 in which a conduit is provided connecting the discharge means of the first rotary part of the valve to the pressure cavity of the second rotary part of the valve whereby said volumetric pump will actuate said hydraulic motor.

10. The combination set forth in claim 9 in which a pressure responsive unit is provided in said conduit to limit the pressure exerted by said pump.

11. The combination set forth in claim 1 in which a central hydraulic pressure station is provided having a pressure outlet and a return, said pressure outlet being connected to the pressure cavity of the second rotary part of the valve and said discharge means of the first rotary part of the valve being connected to said return.

12. The combination set forth in claim 11 in which the pressure cavity of the second rotary part of the valve is connected both to the pressure outlet of said central station and to the discharge means of the first rotary part of the valve, a nonreturn valve is provided permitting flow from said discharge means to the return of the central station when the center station is operative, but permitting actuation of said motor by said pump when the central station is inoperative.

13. The combination set forth in claim 1 in which a central pressure station is provided having a pressure outlet, a reservoir and a return connected to said reservoir, the ducts of said hydraulic motor being connected to said reservoir, nonreturn valves are interposed between said ducts and said reservoir permitting flow of fluid only from said reservoir to said hydraulic motor through said nonreturn valves.

14. The combination set forth in claim 13 in which the intercommunication chamber of the pressure cavity of the second rotary part of the valve when the latter is in neutral position is connected to said reservoir.

15. The combination set forth in claim 1 in which a central hydraulic pressure station is provided having a motor pump adapted to be fed either by said discharge means of said valve or by said reservoir, a one-way valve being connected between said motor pump and said reservoir.

16. The combination set forth in claim 1 in which said valve is closed centered when in neutral position.

17. The combination set forth in claim 1 in which said valve is colsed centered when in neutral position.

18. The combination set forth in claim 1 in which each of said discharge means and said working cavities comprises an annular groove associated with said sleeve and said pressure cavities and said transit cavities each comprises an annular groove associated with said core, each of said grooves having an associated port leading into said manifold and an intercommunication chamber is associated with each of said grooves, a duct connecting each of said grooves with the associated intercommunication chamber, said intercommunication chamber of the pressure cavity of the second part of the rotary valve when the latter is in neutral position, being cut off.

19. The combination set forth in claim 1 in which a central hydraulic pressure station is provided having a pressure outlet and return, said pressure outlet being connected to the pressure cavity of the second rotary part of the valve, said return being connected to the discharge means of the first rotary part of the valve, said pressure outlet and return being connected to said ducts of said hydraulic motor when the valve is in neutral position, said valve providing restricted passages from said pressure source to said motor.

20. The combination set forth in claim 19 in which one of said passages is closed upon slight movement of one of the rotary parts relative to the other whereas the other passage opens further without opening of the return path from the other side of the hydraulic motor.

21. The combination set forth in claim 1 in which said motor, said valve and said pump are connected in the system through which hydraulic fluid flows, said hydraulic fluid being adapted to flow through said pump, the rotation of said pump being proportional to the volume of fluid flowing into and out of said hydraulic motor, the torque exerted on said pump causing a differential reaction which controls the relative position of the two rotary parts.

22. The combination set forth in claim 1 in which hydraulic pressure source is provided having a motor driven pump and a reservoir, said valve operatively connecting said pressure source to said bidirectional pump, said bidirectional pump being traversed by the fluid under pressure from the pressure source.

References Cited

UNITED STATES PATENTS 2,984,215    5/1961    Charlson          60—52 XR
3,059,717   10/1962    Moyer et al.       60—52 XR
3,159,084   12/1964    Zeigler et al.      60—52 XR EDGAR W. GEOGHEGAN, *Primary Examiner.*

U.S. Cl. X.R.

91—375; 180—79.2